US005403494A

United States Patent [19]

Cain

[11] Patent Number: 5,403,494

[45] Date of Patent: Apr. 4, 1995

[54] METHOD OF RECOVERY OF SINGLE COLOR PRINTING INK WASTES

[75] Inventor: Michael D. Cain, Lawrence, Kans.

[73] Assignee: The Lawrence Paper Company, Lawrence, Kans.

[21] Appl. No.: 91,969

[22] Filed: Jul. 15, 1993

[51] Int. Cl.[6] .................... C02F 1/52

[52] U.S. Cl. .................... 210/710; 210/724; 210/725; 210/734; 210/737; 210/768; 210/774; 210/917; 101/491; 106/204

[58] Field of Search .................... 101/491; 106/20 A; 210/710, 724, 725, 732, 734, 735, 737, 768, 769, 771, 774, 806, 808, 917

[56] References Cited

U.S. PATENT DOCUMENTS

| | | | |
|---|---|---|---|
| 3,835,045 | 9/1974 | Hussissian | 210/709 |
| 3,868,320 | 2/1975 | Hider et al. | 210/727 |
| 4,738,785 | 4/1988 | Langston et al. | 210/738 |
| 4,816,164 | 3/1989 | Presley | 210/710 |
| 5,200,094 | 4/1993 | Hill et al. | 210/768 |
| 5,286,390 | 2/1994 | Gray et al. | 210/735 |

*Primary Examiner*—Peter A. Hruskoci
*Attorney, Agent, or Firm*—Hovey, Williams, Timmons & Collins

[57] ABSTRACT

An improved process is provided for the steam conversion of dilute printer ink washup fluids, and especially those of a single color, in order to permit reuse of the ink fraction of the fluids as reconstituted printing inks. Preferably, the washup fluids are acidified to create a pin floc therein, with a final pH of from about 2-7; the acidified fluid is then contacted with a stream of steam in a hydroheater (16) in order to convert the residual ink fraction and permit reconstitution thereof into printing ink. The acidifying agent is preferably an acid polymer or an inorganic acid such as HCl or $H_2SO_4$.

20 Claims, 2 Drawing Sheets

METHOD OF RECOVERY OF SINGLE COLOR PRINTING INK WASTES

BACKGROUND OF THE INVENTION

1. Field of the Invention

The present invention is broadly concerned with an improved process for the recovery of dilute printing ink wastes, and particularly those of a single primary color, generated as a byproduct of commercial printing operations. More particularly, the invention si concerned with such a process wherein dilute washup fluids containing water, a minor amount of residual ink, and typical ink carriers, is initially acidified to create a pin floc, whereupon the acidified fluid is reacted and converted by contacting the fluid with a stream of steam. The invention thus permits the recovery and reuse of valuable single color ink wastes, and the production of reconstituted inks therefrom.

2. Description of the Prior Art

U.S. Pat. No. 5,200,094 describes a process wherein ink wastes (e.g., a chemically treated and concentrated mixture of ink wastes derived from a number of printing runs) are treated in a confined zone with steam in order to convert the residual ink into a product which can be readily reconstituted as high quality black ink. The process described in the '094 patent represents a significant break through in the art, inasmuch as it provides a practical, low cost way to treat and reuse the considerable volumes of ink wastes generated in commercial printing plant operations. Such wastes have presented a significant disposal problem in the past, owing to increasingly stringent environmental regulations prohibiting direct disposal of the ink wastes.

In addition, a related patent application (Ser. No. 08/033,868 filed Mar. 19, 1993) describes a similar ink waste conversion process wherein use is made of dilute washup fluids containing water and a minor amount of residual ink. Here again, this process contemplates contacting the dilute washup material with a stream of steam in a confined zone. The process of this patent application thereby eliminates the need for preliminary chemical treatment and concentration of the recovered printing ink wastes.

While the processes described in this patent and pending application have proved to be highly successful, in general they have been most successfully implemented with mixtures of different color ink wastes and the resultant production of reconstituted black inks. Attempts at using the processes for the production of single color reconstituted inks have been less successful, resulting in viscous filter pressed material which tend to rapidly plug the press and are difficult to reformulate with ink carriers. Black printing ink is relatively low in cost and readily available from other sources. However, some single color inks (e.g., red, blue, purple, etc.) are considerably more expensive. Accordingly, if these processes could be improved to more readily produce acceptable reconstituted single color inks, the economic benefits would be significant. U.S. Pat. No. 5,200,094 and the aforementioned pending patent application are incorporated by reference herein.

SUMMARY OF THE INVENTION

The present invention overcomes the problems outlined above, and provides an improved process for the treatment of dilute printer washup fluid, and particularly those of a single color, in order to produce a converted final product which can be readily reformulated as a single color printing ink. Broadly speaking, the process involves first treating dilute washup fluid (either single color or the combination of individual colors of washup fluids derived from any conventional type of ink such as flexographic or lithographic inks) with an acidifying agent; such fluids normally have a solids content of up to about 5% by weight, and more usually up to about 2% by weight. After acidification, the fluid is contacted with steam to create a converted product suitable for reconstitution into printing ink.

In more detail, it is preferred that sufficient amount of the acidifying agent be added to break the normal ink emulsion contained in the fluid; this is generally apparent by the formation of a pin floc, i.e., very tiny agglomerations of pigment and resin particles surrounded by clear liquid. Normally, enough acidifying agent is added to the fluid to lower the pH level thereof at least 1 pH unit. In most cases, the final pH of the acidified fluid ranges from about 2–7, and most preferably from about 5.5–7. The acidifying agent is advantageously selected from the group consisting of acid and acid polymers, with the acids normally employed being the inorganic acids such as HCl and $H_2SO_4$. Suitable acid polymers are the cationic polymers such as Aquafloc 412 sold by the Dearborn Division of W. R. Grace Company, and Polyal-201 sold by Beckart International of Kenosha, WI. MSDS sheets relating to these polymers, as well as a trade brochure #42-412 pertaining to Aquafloc 412 are incorporated by reference herein.

In preferred forms, the conversion process wherein the acidified washup fluid is contacted with steam is carried out in a confined zone in order to subject the ink waste to elevated temperatures and pressures, and intense shear. A hydroheater of the type described in U.S. Pat. No. 5,200,094 is a particularly preferred device for this purpose. Generally, the steam used in the process should have a temperature of from about 250°–350° F., and more preferably from about 275°–310° F. This contacting step should be carried out at a pressure of from about 15–80 psi, and more preferably from about 30–60 psi.

After the conversion process, the processed and converted residual ink is recovered which usually involves reducing the residual ink to a powder having an average particle size of from about 100–400 microns. Such reduction may involve filter pressing the liquid product from the hydroheater with subsequent grinding of the filter cake, or any other conventional recovery and subdivision techniques.

The powder products can then be reconstituted into high quality printing inks by the addition of ink carriers such as emulsions and let-down vehicles. These ink products can then be color-modified by the addition of toners as desired to achieve a desired final color ink.

DESCRIPTION OF THE PREFERRED EMBODIMENT

Figure 1:
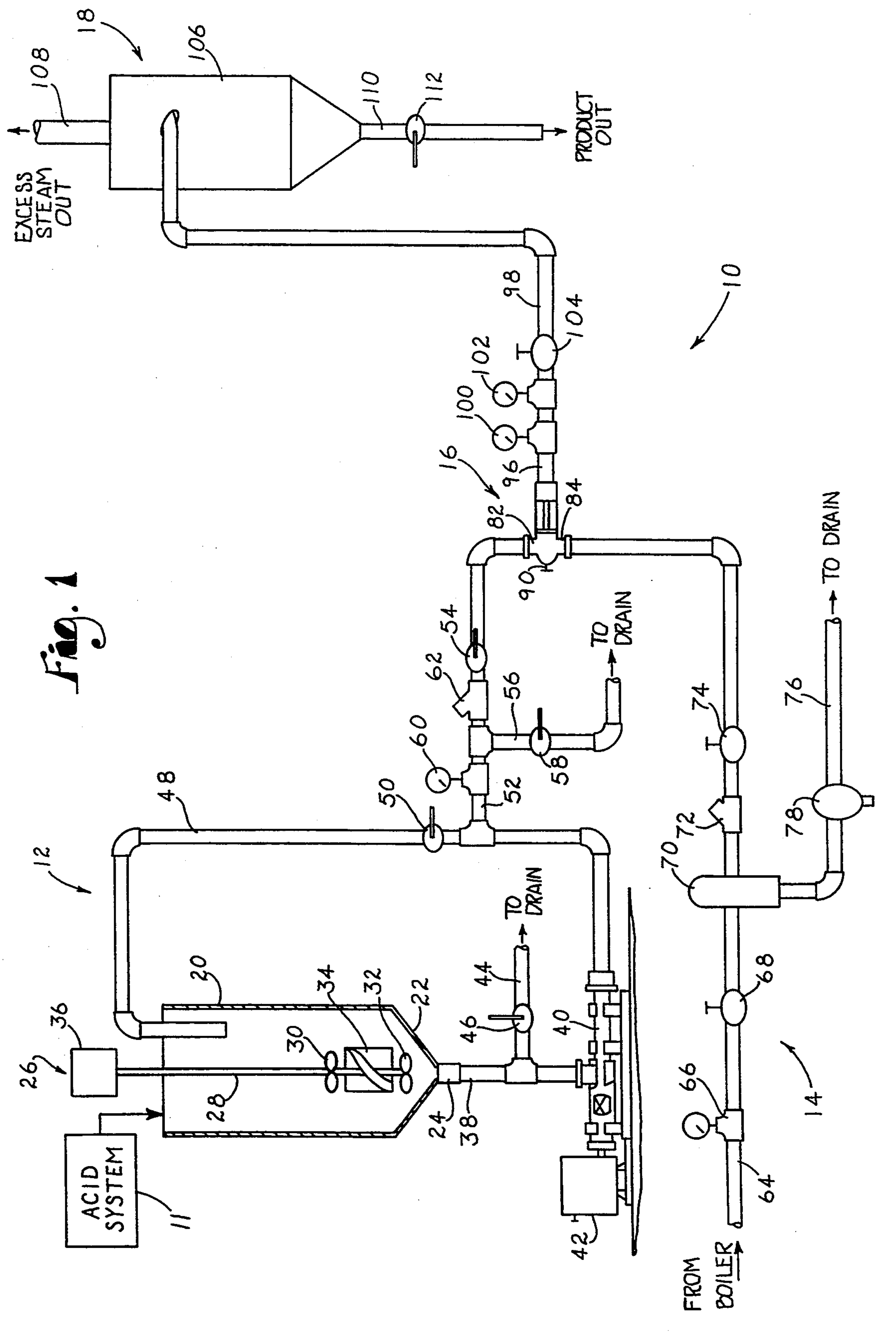
FIG. 1 is a partially schematic view illustrating the preferred processing apparatus for single or multiple color ink washup fluids in accordance with the invention.

Turning now to the drawings, and particularly FIG. 1, a system 10 for processing of washup fluids is illustrated. Broadly speaking, the system 10 includes acidification means 11, mixing assembly 12, steam system 14, hydroheater 16 and downstream processing assembly 18.

The system 11 can be any convenient means for acidifying the starting washup fluid to a sufficient extent to create a pin floc condition. Therefore, any suitable vessel (with or without stirring means) can be used, so long as it has sufficient volume to handle the incoming fluid and acidulent. Of course, in lieu of a separate acidifying system, acid may be added directly to the dilute washup fluid within vessel 20 described below.

The assembly 12 includes an upright, open top mixing vessel 20 presenting a frustoconical bottom 22 terminating in an outlet 24. A mixer 26 is situated within vessel 20 and includes an elongated shaft 28 equipped with a pair of spaced apart, three-bladed mixing elements 30, 32, as well as an ink mixing prop 34 between the elements 30, 32. The shaft 28 is coupled to an electric motor 36 for high speed rotation thereof.

Vessel outlet 24 is coupled to an outlet pipe 38 which leads to the input of a Moyno pump 40, the latter being driven through a motor and Reeves drive assembly 42. A drain pipe 44 equipped with a ball valve 46 is connected to the pipe 38 intermediate the ends thereof as shown.

The output of pump 40 is connected to a recirculation pipe 48 which leads back to and has an open end terminating within vessel 20. The pipe 48 is equipped with a ball valve 50, and a processing line 52 is teed from the recirculation pipe 48 upstream of the valve 50.

Processing line 52 has a control ball valve 54 therein as well as a teed drain pipe 56, controlled by ball valve 58, pressure gauge 60 and check valve 62. The end of line 52 remote from recirculation 48 is coupled to the inlet of hydroheater 16.

Steam system 14 is conventional, and includes a boiler (not shown) coupled with a steam delivery line 64. The latter has a pressure gauge 66, gate-type steam valve 68, condensate separator 70, check valve 72 and gate valve 74 therein. The delivery end of line 64 is coupled to the steam inlet of hydroheater 16 as illustrated. A drain line 76 equipped with trap 78 is coupled with the separator 70.

Figure 2:
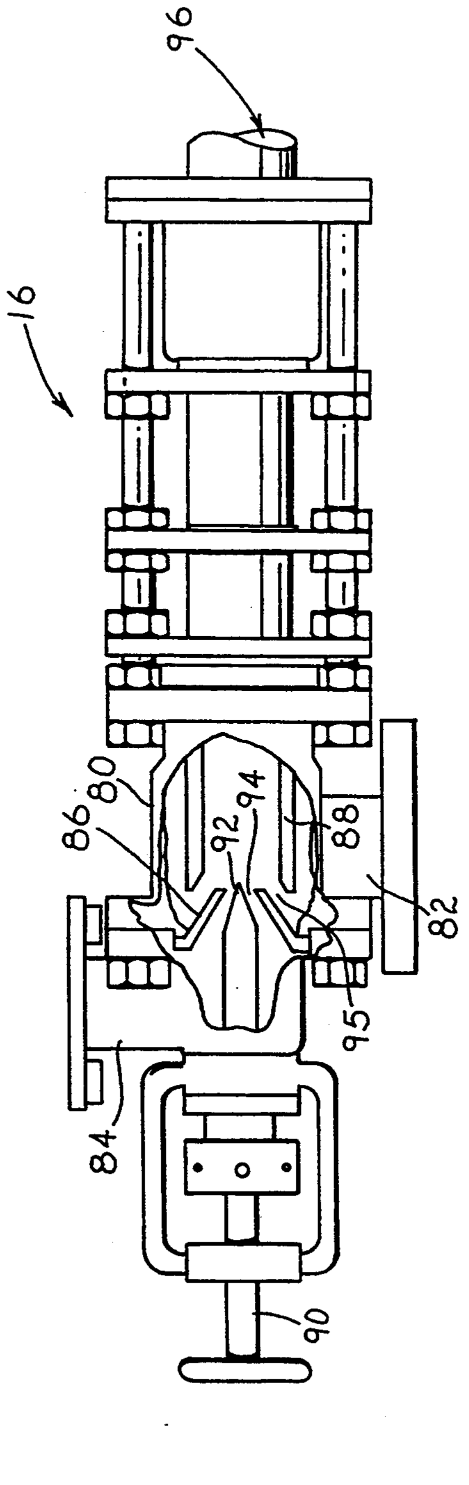
FIG. 2 is a fragmentary view with parts broken away for clarity of the reaction section of a typical hydroheater device used in processing single or multiple color washup fluids.

Referring now to FIG. 2, the hydroheater 16 is illustrated in detail. Specifically, the hydroheater 16 is in the form of an elongated tubular body or combining tube 80 presenting a tubular inlet 82 for material to be processed, and an opposed, tubular steam inlet 84. Internally, the hydroheater includes a frustoconical wall 86 together with an elongated, axially oriented and adjustable tubular wall 88. A rotatable steam needle valve 90 extends into the body 80 and has a tapered end 92 which is complemental with frustoconical wall 86. As will be perceived from a study of FIG. 2, the wall 86 and end 92 cooperatively define a steam outlet orifice 94. Also, a restricted annular orifice 95 is defined between the walls 86, 88 as depicted. It will also be evident that rotation of needle valve 90 has the effect of enlarging or restricting the dimensions of the steam orifice 94.

As is also clear from FIG. 2, tubular inlet 84 communicates with the interior of body 80 upstream of the largest diameter end of wall 86, so that incoming steam is forced to pass through orifice 94. On the other hand, material inlet 84 is oriented such that incoming ink waste material is directed into body 80 downstream of wall 86, and must pass through orifice 95. In this fashion, the hydroheater 16 is designed so that steam entering inlet 84 is caused to intersect with the stream to be processed as the latter passes through the orifice 95. By virtue of the confined nature of the hydroheater body 80, and the relative orientation of the walls 86, 88, the material to be processed is thereby subjected to elevated temperatures and pressures and very intense shear conditions within the hydroheater. Tubular wall 88 passes out of the end of body 80 as shown, and defines the output end 96 of the hydroheater 16. Therefore, material processed within the confined reaction zone of the hydroheater passes directly out through end 96.

Returning to FIG. 1, it will be seen that the processing assembly 18 includes an output delivery pipe 98 equipped with temperature and pressure gauges 100, 102 and back pressure gate valve 104. The end of pipe 98 remote from hydroheater 16 communicates with a blow down chamber 106. The latter has an overhead steam outlet pipe 108 extending from the upper end thereof, as well as a finished product line 110 extending from its lower end and having ball control valve 112 therein.

U.S. Pat. No. 5,002,904 also describes a more sophisticated in-plant apparatus for the processing and treatment of printing ink wastes. Such a system could also be used in the context of the present invention, so long as means is provided for the preliminary acidification of the dilute washup fluids.

EXAMPLE

In this comparative test, a total of 50 gallons of simulated flexographic ink washup fluid was produced. One gallon of GCMI #387 Blue flexographic ink (average of 52.46% by weight solid, pH=8.55), along with 0.5 gallon APC 209 detergent and 49.5 gallons water were placed in a 124 gallon stainless steel test tank equipped with a mixer/agitator, followed by complete mixing for 15 minutes. The resultant simulated washup fluid had an average solids content of 1.17% by weight and a pH of 8.5.

This dilute material was then tested to ascertain the effect of acidification prior to hydroheater conversion. Specifically, the following 5-gallon tests were conducted:

1. Conversion at 310° F., no acidification;
2. Conversion at 310° F., with subsequent acidification acid polymer (Polyal-201);
3. Conversion at 275° F. no acidification;
4. Conversion at 275° F. with subsequent acidification using acid polymer (Polyal-201);
5. Conversion at 310° F., with prior acidification; and
6. Conversion at 275° F. with prior acidification.

In particular, the 50-gallon test batch was placed in the tank 20 (see FIG. 1) and was recirculated using pump 40 and line 48. At the same time, steam was introduced into the system by opening valve 68, and condensate water was removed via separator 70. Thereafter, valve 74 was opened until 120 psi steam was passing through the hydroheater 16. When the hydroheater reached 250° F., steam valve 104 was manipulated to achieve the desired steam temperature (either 275° F. [30 psi]or 310° F. [60 psi]) in the hydroheater. At this point, the wastewater in tank 20 was introduced into hydroheater 16 by opening valve 54 and closing valve 50, at a pumping rate of 1 gallon/minute.

The dilute washup material was subjected to increased temperature, pressure and shear within hydroheater 16, owing to the interaction of the streams of washup fluid and steam therein. The converted material was then passed through conduit 98 and into blowdown chamber 106, and excess steam was vented through pipe 108. The final product at 212° F. was then directed through valve 112 for collection in pails. This resulted in the collection of four 5-gallon pails of converted material, corresponding to tests 1–4.

At this point, the remaining washup liquid in tank 20 was acidified by the addition of 200 ml of Polyal-201 and subsequent recirculation via pump 40 and conduit 48 for 10 minutes. The acidified fluid was then converted at 310° F. (test 5) and 275° F. (test 6) as described previously with the 5-gallon test of batches being collected in pails.

The collected results of tests 1–6 were allowed to cool overnight. The collected samples for tests 2 and 4 (pH=7.85) were then acidified with Polyal-201 (about 20 ml/pail) and agitated; the final pH/solids content (% by weight) values of these agitated samples were 6.75/1.25 and 6.70/1.21 respectively. The cooled, non-acidified samples (tests 1 and 3) were similarly agitated and exhibited pH/solids content values of 7.90/1.14 and 7.90/1.17, respectively. Finally, the pre-acidified samples (tests 5 and 6) were agitated and analyzed to exhibit pH/solids content values of 7.65/1.25 and 7.551 (value not recorded), respectively. The pre-acidified test samples 5 and 6 exhibited a clear-yellowish supernate with solids settled to the bottom.

At this point, the individual samples were subjected to filter pressing in an attempt to obtain a useful filter cake for subsequent production of reconstituted blue ink. The test 1 sample was passed through the press equipped with 4 1.5 micron pads, 2 screens and 1 solids retainer. The supernate was clear but blinding of the pads was almost immediate. Six micron pads were then substituted, giving a murky-blue supernate unacceptable for plant reuse. Insufficient cake (29.48% by weight solids) was preserved to make an ink, but did look acceptable. The #3 test sample was pressed using 3 micron pads and also gave a murky, unacceptable supernate. The cake (42.898% by weight solids) was of insufficient quantity to make any ink.

The post-conversion acidified samples 2 and 4 were pressed using 3 micron pads, giving a clear supernate. The filter cakes had a solids content of 36.32% and 36/18% by weight, respectively.

The pre-acidified test samples 5 and 6 were also pressed using 3 micron pads, giving clear supernates and a solids content of 33.40% (test 5) and 32.70% (test 6).

The filter cakes recovered from runs 2, 4, 5 and 6 were then used to formulate inks. This involved grinding together 25 grams of KF-168945 ink emulsion (INX International, Inc., Kansas City, Kans.) in a blender for a time sufficient to obtain a 7.0–8.0 Hegman grind. This material was then dropped into an additional 75 grams of KF-16845 emulsion as a let-down vehicle, followed by further agitation with a magnetic stirrer to give a finished ink. If desired, the color of the reconstituted ink can be changed as desired by the addition of predispersed (INX International, Inc.) or powdered (Archway Chemical Supply, North Kansas City, Mo.) toners. In this way, the original GCMI color can be matched, or other blue shades can be formulated.

The post-acidified filter cake samples from tests 2 and 4 produced very viscous unstable final products unsuitable for use as flexographic inks. On the other hand, the filter cakes in accordance with the invention (tests 5 and 6) were readily formulated into flowable, high quality blue inks of proper viscosity, which could be easily modified.

Similar series of conversion experiments using simulated single color washup fluids were carried out using PMS-293 blue, and GCMI 75 red inks, with APC-209 and APC Super Powder detergents. Filter pressings were conducted with various sizes of pads up to 20 microns. The resultant inks produced from pre-conversion acidified washup fluid (tests 5 and 6) were superior.

Finally, a number of pre-conversion acidified test samples in accordance with the invention were conducted using actual plant washup fluid mixed black and various acidifying agents (Aquafloc 412, reagent grade HCl and 66° Baume $H_2SO_4$); and a pre-conversion acidified test was conducted using a simulated single color (PMS 186) red ink washup fluid acidified with acetic acid. The Aquafloc 412 HCl and $H_2SO_4$ tests gave excellent reconstituted black inks, while the acetic acid test gave a gritty converted product.

These tests demonstrate that preliminary acidification prior to steam conversion gives a final product which is markedly superior to unacidified or post-conversion acidified washup fluids, both in terms of workability of the products and the quality of final reconstituted inks.

I claim:

1. In a process wherein dilute washup fluid containing water and an amount of residual ink including pigment and resin particles is contacted with steam in order to create a process residual ink suitable for reconstitution into a printing ink, the improvement which comprises the step of adding a sufficient amount of an acidifying agent to said dilute washup fluid to create a pin floc including at least a portion of said pigment and resin particles therein and prior to said contact between said washup fluid and said steam, and thereafter contacting said washup fluid with said floc therein with said steam having a temperature of about 250°–350° F. while subjecting said washup fluid to shear at a pressure of from about 15°–80° psi to form said processed residual ink, and then passing said processed residual ink through a filter press to remove at least a portion of liquid therefrom and form a filter cake.

2. The process of claim 1, including the step of adding a sufficient amount of said agent to said fluid to lower the pH of the fluid at least about 1 pH unit.

3. The process of claim 1, wherein the pH of the acidified fluid ranges from about 2–7.

4. The process of claim 3, said pH ranging from about 5.5–7.

5. The process of claim 1, said agent being selected from the group consisting of acids and acid polymers.

6. The process of claim 5, said acids being selected from the group consisting of the inorganic acids.

7. The process of claim 6, said inorganic acids being selected from the group consisting of HCl and $H_2SO_4$.

8. The process of claim 1, said washup fluid being derived from flexographic or lithographic washup fluid.

9. The process of claim 1, said washup fluid being of essentially a single primary color.

10. The process of claim 1, said washup fluid being formed of a mixture of individual color washup fluids.

11. The process of claim 1, said washup fluid having a solids content of up to about 5% by weight.

12. The process of claim 11, said solids content being up to about 2% by weight.

13. The process of claim 1, including the step of contacting said fluid and steam in a confined zone.

14. The process of claim 1, said temperature being from about 275°-310° F.

15. The process of claim 1, said pressure being from about 30-60 psi.

16. The process of claim 1, including the step of recovering said processed residual ink after said contact step.

17. The process of claim 16, including the step of recovering said processed residual ink to a powder.

18. The method of claims 17, said powder having an average particle size of from about 100-400 microns.

19. The method of claim 17, including the step of mixing said powder with ink carriers to form a printing ink.

20. The method of claim 1, including the step of subdividing said filter cake and mixing said subdivided filter cake with ink carriers to form a printing ink.

* * * * *